United States Patent
Patterson

(10) Patent No.: US 9,631,591 B2
(45) Date of Patent: *Apr. 25, 2017

(54) POSITIVE DISPLACEMENT RADICAL INJECTION SYSTEM

(71) Applicant: GE Oil & Gas Compression Systems, LLC, Houston, TX (US)

(72) Inventor: Mark Patterson, Houston, TX (US)

(73) Assignee: GE Oil & Gas Compression Systems, LLC, Houston, TX (US)

(*) Notice: Subject to any disclaimer, the term of this patent is extended or adjusted under 35 U.S.C. 154(b) by 216 days.

This patent is subject to a terminal disclaimer.

(21) Appl. No.: 14/286,781

(22) Filed: May 23, 2014

(65) Prior Publication Data

US 2014/0331965 A1   Nov. 13, 2014

Related U.S. Application Data

(63) Continuation of application No. 12/944,675, filed on Nov. 11, 2010, now Pat. No. 8,844,498.

(51) Int. Cl.
*F02M 43/00* (2006.01)
*F02B 19/06* (2006.01)
*F02B 19/10* (2006.01)
*F02B 25/14* (2006.01)

(52) U.S. Cl.
CPC ............ *F02M 43/00* (2013.01); *F02B 19/06* (2013.01); *F02B 19/1023* (2013.01); *F02B 25/14* (2013.01); *Y02T 10/125* (2013.01)

(58) Field of Classification Search
CPC ..... F02M 43/00; F02B 19/06; F02B 19/1023; F02B 25/14; Y02T 10/125

USPC ............... 123/143 B, 143 R, 257, 267, 276, 123/286–288, 304

See application file for complete search history.

(56) References Cited

U.S. PATENT DOCUMENTS

| 3,092,088 A | * | 6/1963 | Goossak | F02B 19/1004 123/258 |
| 3,230,939 A | * | 1/1966 | Goossak | F02B 19/1004 123/258 |
| 3,283,751 A | * | 11/1966 | Goossak | F02B 19/1014 123/259 |
| 3,802,827 A | * | 4/1974 | Semenov | F23D 14/00 431/285 |
| 4,075,996 A | * | 2/1978 | Hisserich | F02B 7/02 123/143 A |

(Continued)

FOREIGN PATENT DOCUMENTS

| CN | 101415918 A | 4/2009 |
| CN | 101855444 A | 10/2010 |

(Continued)

OTHER PUBLICATIONS

PCT Search Report and Written Opinion for PCT/US2011/047801, mailed on Nov. 9, 2011.

(Continued)

*Primary Examiner* — Joseph Dallo
(74) *Attorney, Agent, or Firm* — Mintz Levin Cohn Ferris Glovsky and Popeo, P.C.

(57) ABSTRACT

A system, comprising, a combustion chamber, and a free-radical injector configured to inject free radicals into the combustion chamber at an ignition timing to trigger combustion of a fuel-air mixture.

20 Claims, 9 Drawing Sheets

(56) References Cited

U.S. PATENT DOCUMENTS

| | | | | |
|---|---|---|---|---|
| 4,287,862 A | * | 9/1981 | Noguchi | F02B 5/00 123/146.5 A |
| 4,292,935 A | * | 10/1981 | Wagner | F02B 19/14 123/275 |
| 4,294,208 A | * | 10/1981 | Wagner | F02B 19/14 123/285 |
| 4,305,357 A | * | 12/1981 | Scherenberg | F02B 1/02 123/254 |
| 4,320,728 A | * | 3/1982 | Artman | F02B 19/12 123/260 |
| 4,327,681 A | * | 5/1982 | Latsch | F02B 19/1009 123/254 |
| 4,332,224 A | * | 6/1982 | Latsch | F02B 19/1004 123/254 |
| 4,347,814 A | * | 9/1982 | Besslein | F02B 19/14 123/261 |
| 4,651,703 A | * | 3/1987 | Hoppie | F02B 19/06 123/48 D |
| 4,766,855 A | * | 8/1988 | Tozzi | F02P 9/007 123/143 B |
| 5,222,993 A | * | 6/1993 | Crane | F02B 19/12 123/256 |
| 5,307,772 A | * | 5/1994 | Rao | F02B 19/165 123/272 |
| 5,662,082 A | * | 9/1997 | Black | F02B 19/1009 123/254 |
| 6,116,207 A | * | 9/2000 | Firey | F02B 17/00 123/250 |
| 6,125,813 A | * | 10/2000 | Louthan | F01C 1/22 123/209 |
| 6,571,755 B1 | * | 6/2003 | Dunn | F02B 33/22 123/21 |
| 6,786,716 B1 | | 9/2004 | Gardner et al. | |
| 6,986,342 B2 | | 1/2006 | Thomas | |
| 7,100,567 B1 | * | 9/2006 | Bailey | F02B 19/06 123/268 |
| 7,464,688 B2 | * | 12/2008 | Yu | F02D 41/3047 123/299 |
| 7,469,662 B2 | * | 12/2008 | Thomas | F02B 19/12 123/258 |
| 7,493,886 B2 | * | 2/2009 | Blank | F02B 11/00 123/256 |
| 7,497,204 B2 | * | 3/2009 | Perryman | F02D 41/2096 123/479 |
| 7,533,655 B2 | * | 5/2009 | Allen | F02D 41/2096 123/436 |
| 7,637,254 B2 | | 12/2009 | Plata | |
| 7,743,754 B2 | | 6/2010 | Cheiky et al. | |
| 8,567,369 B2 | | 10/2013 | Johnson | |
| 8,844,498 B2 | | 9/2014 | Patterson | |
| 2006/0037567 A1 | * | 2/2006 | Thomas | F02B 19/12 123/56.7 |
| 2006/0096570 A1 | * | 5/2006 | Tourteaux | F02B 17/005 123/266 |
| 2007/0137611 A1 | * | 6/2007 | Yu | F02D 41/3047 123/304 |
| 2007/0215098 A1 | * | 9/2007 | Hashimoto | F02M 1/165 123/304 |
| 2007/0235002 A1 | * | 10/2007 | Blank | F02B 11/00 123/275 |
| 2008/0017136 A1 | * | 1/2008 | Sciamanna | F02D 41/0025 123/1 A |
| 2008/0022965 A1 | * | 1/2008 | Bysveen | F02D 19/0647 123/294 |
| 2008/0178836 A1 | * | 7/2008 | Yamashita | F02B 17/00 123/295 |
| 2009/0031984 A1 | * | 2/2009 | Shiraishi | F02P 9/007 123/260 |
| 2009/0078228 A1 | * | 3/2009 | Tsutsumizaki | F02M 25/10 123/143 B |
| 2009/0114178 A1 | * | 5/2009 | Coates | F02C 3/20 123/143 B |
| 2009/0255508 A1 | * | 10/2009 | Cheiky | F02M 27/02 123/301 |
| 2010/0258097 A1 | | 10/2010 | Takahashi et al. | |
| 2011/0056445 A1 | | 3/2011 | Plata | |
| 2011/0108009 A1 | | 5/2011 | Plata | |
| 2011/0118957 A1 | | 5/2011 | Plata | |
| 2012/0103302 A1 | * | 5/2012 | Attard | F02B 19/12 123/260 |
| 2012/0118263 A1 | | 5/2012 | Patterson | |
| 2014/0026846 A1 | | 1/2014 | Johnson | |

FOREIGN PATENT DOCUMENTS

| | | |
|---|---|---|
| DE | 3429315 A1 | 2/1986 |
| FR | 2539457 A1 | 7/1984 |
| FR | 2810692 A1 | 12/2001 |
| GB | 2089889 A | 6/1982 |
| JP | 55093968 A | 7/1980 |
| JP | 7127452 A | 5/1995 |
| WO | 00/08317 A1 | 2/2000 |
| WO | 2009/114327 A1 | 9/2009 |

OTHER PUBLICATIONS

International Search Report and Written Opinion for PCT No. PCT/US2011/047795 dated Nov. 9, 2011; 13 pgs.

Unofficial English Translation of Chinese Office Action issued in connection with corresponding CN Application No. 201180064663.4 on Jan. 20, 2015.

* cited by examiner

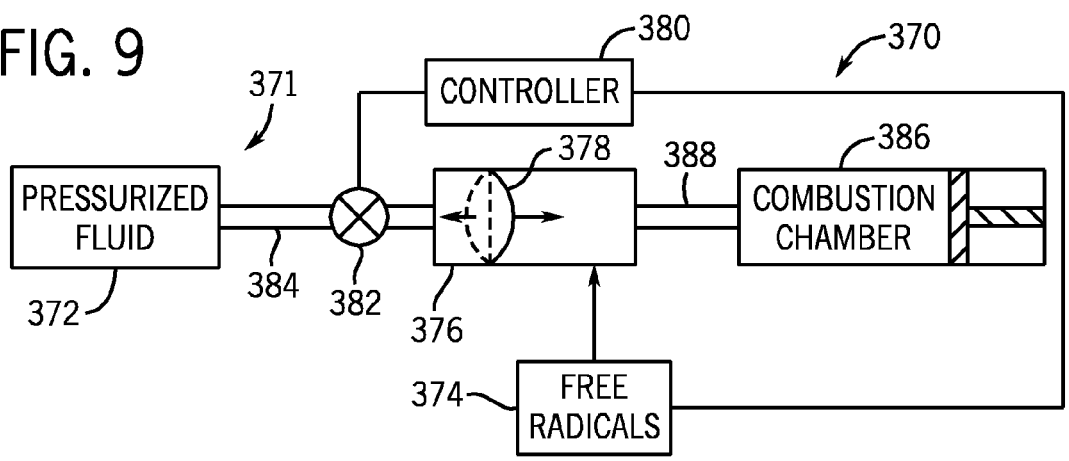
FIG. 9
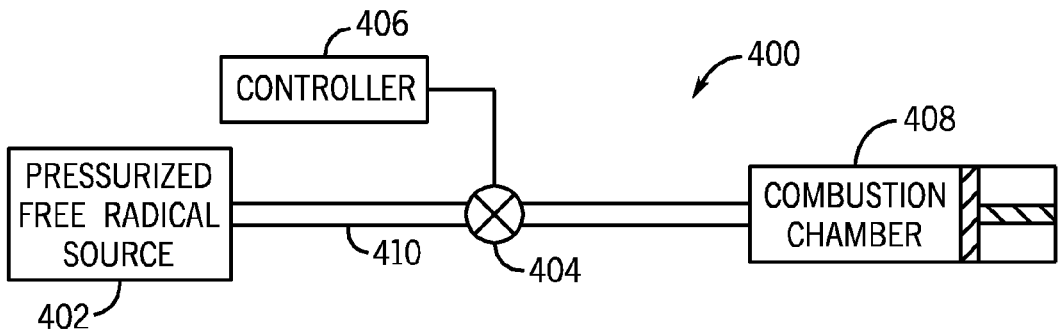
FIG. 10
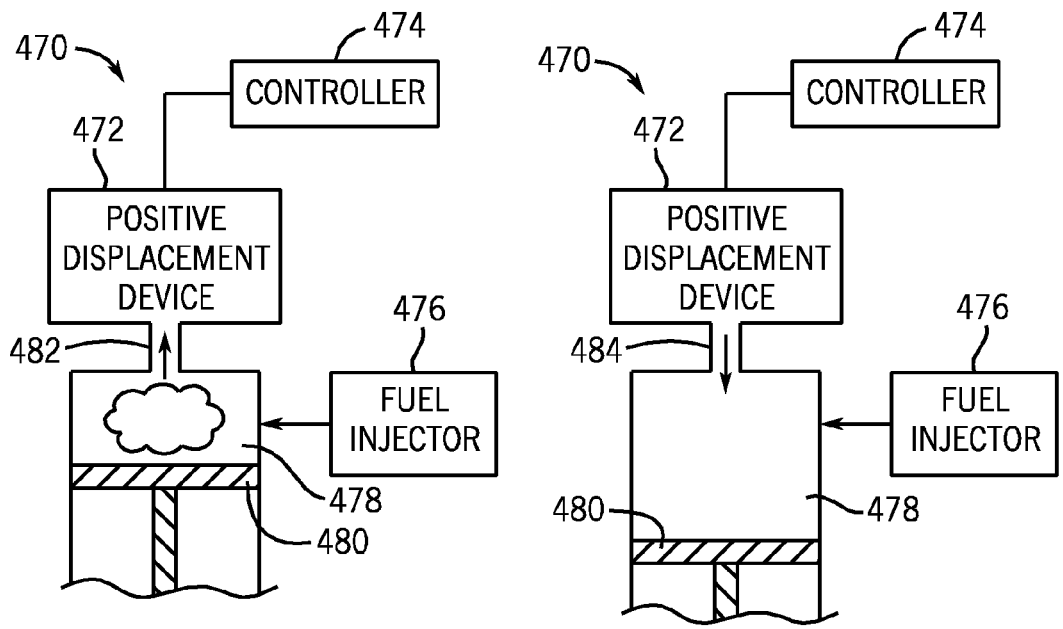
FIG. 12A
FIG. 12B

POSITIVE DISPLACEMENT RADICAL INJECTION SYSTEM

CROSS REFERENCE TO RELATED APPLICATION

This application claims priority to and benefit of U.S. Non-Provisional patent application Ser. No. 12/944,675, entitled "Positive Displacement Radical Injection System", filed Nov. 11, 2010, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since its inception the internal combustion engine has become an important part of everyday life. Internal combustion engines are now used in a wide variety of situations ranging from motor vehicles to machinery. To operate an internal combustion engine, fuel and air are mixed and ignited in a chemical reaction that turns chemical energy into useful mechanical energy. This combustion process can create undesirable byproducts such as carbon monoxide (CO), nitrogen oxides ($NO_x$), and non-methane hydrocarbons (NMHC). These undesirable byproducts can be created when the combustion process fails to burn all of the fuel in the mixture and/or the combustion process takes too long allowing these undesirable byproducts to form. As government agencies tighten restrictions and corporations continue to promote their positive environmental impact, a need exists to create more efficient engines that produce fewer undesirable emissions.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 9 is a schematic of an embodiment of a free radical injection system;

FIG. 10 is a schematic of an embodiment of a free radical injection system;

FIGS. 12A and 12B are schematics of an embodiment of a free radical injection system, illustrating an engine cycle.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed below, the discussed embodiments provide a free radical injection system, which injects a free radicals into a combustion chamber to ignite a fuel-air mixture. The free radicals may be in either a gaseous form or a liquid form. In certain embodiments, the free radical injection may include one or more positive displacement devices to inject the free radicals. For example, the positive displacement may include a piston, a solenoid, a membrane, or other suitable mechanism. Alternatively, the free radical injection system may include a pressurized source of free radicals, which are injected into the combustion chamber via operation of a valve. The free radicals are injected at an appropriate time to trigger ignition, and thus combustion in the combustion chamber.

Figure 1:
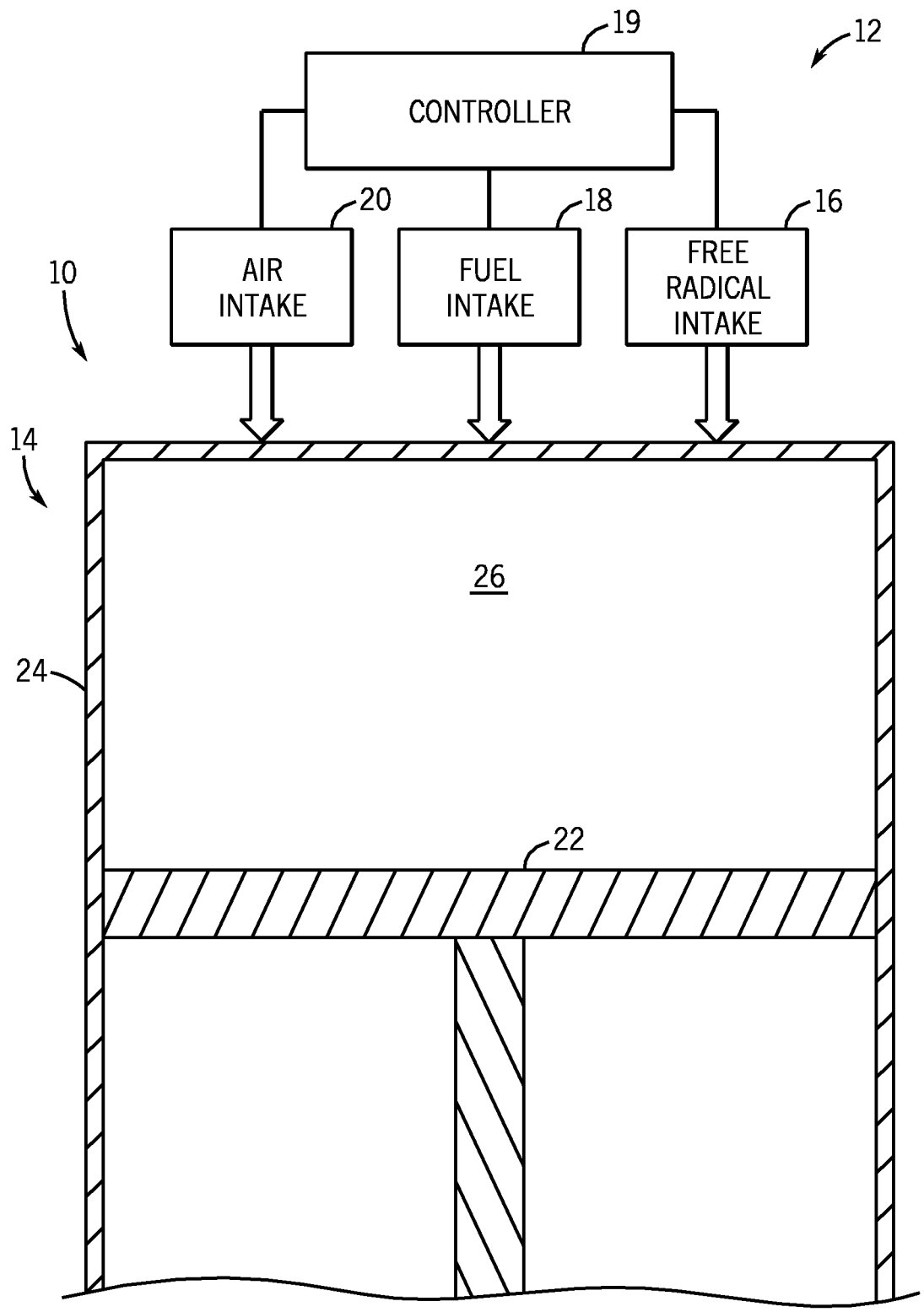
FIG. 1 is a schematic of an exemplary free radical injection system.

FIG. 1 is a schematic of an embodiment of a system 10 having a free radical injection system 12 coupled to a combustion chamber 14, wherein the free radical injection system 12 is configured to inject free radicals to trigger ignition in the combustion chamber 14. In certain embodiments, the free radicals may include gaseous peroxides, aldehydes, monatomic hydrogen, or any combination thereof. In other embodiments, the peroxides, aldehydes, monatomic hydrogen, or any combination thereof may be combined with water to form liquid free radicals. As illustrated, the free radical injection system 12 includes a controller 19 coupled to a free radical intake or supply 16, a fuel intake or supply 18, and an air intake or supply 20. As discussed in detail below, the controller 19 is configured to control the quantity and timing of free radical injection via the intake 16 in conjunction with the quantity and timing of fuel injection and air supply into the combustion chamber 14. In certain embodiments, the free radical intake 16 includes a positive displacement device, such as a piston, a diaphragm, a solenoid, or another suitable device. By further example, the positive displacement device may include rotary pumps, reciprocating pumps, gear pumps, progressing cavity pumps, peristaltic pumps. Some exemplary rotary pumps may include lobe, external gear, internal gear, screw, shuttle block, flexible vane or sliding vane, helical twisted roots, or liquid ring vacuum pumps. Some exemplary reciprocating pumps include piston and diaphragm pumps. Regardless of the type of positive displacement device, the free radical intake 16 may positively force the free radicals into the combustion chamber 14 to trigger ignition of a fuel air mixture from the fuel intake 18 and the air intake 20.

As illustrated, the combustion chamber 14 includes a piston 22 disposed in a cylinder 24, such as a piston-cylinder assembly of a combustion engine. For example, the combustion chamber 14 may be one of many combustion chambers of a gasoline fueled engine or a diesel fueled engine. As the piston 22 moves upward within the cylinder 24, the piston 22 compresses a combustion volume 26 having the air and eventually the fuel from the intakes 18 and 20. For example, the fuel intake 18 may inject the fuel at one or more times during the upward stroke of the piston 22 as the piston approaches a top dead center position. As this point, the fuel air mixture is at an elevated pressure and an elevated temperature due to the compression by the piston 22. At some time near or after top dead center, the controller 19 is configured to inject the free radicals from the free radical intake 16 into the combustion volume 26 to ignite the fuel air mixture.

The combination of the fuel air mixture, the elevated pressure, the elevated temperature, and the free radicals enables the free radicals to rapidly ignite the fuel air mixture. For example, the free radical intake 16 may inject one or more streams or dispersed flows of the free radicals into the combustion volume 26, thereby quickly igniting the fuel air mixture via free radical ignition (i.e., without a spark). It should be noted that the free radical induced ignition and combustion is particularly more rapid than convention ignition mechanisms (e.g., spark ignition or compression ignition), and the rapid nature of the free radical induced ignition and combustion may substantially reduce exhaust emissions.

Figure 2:
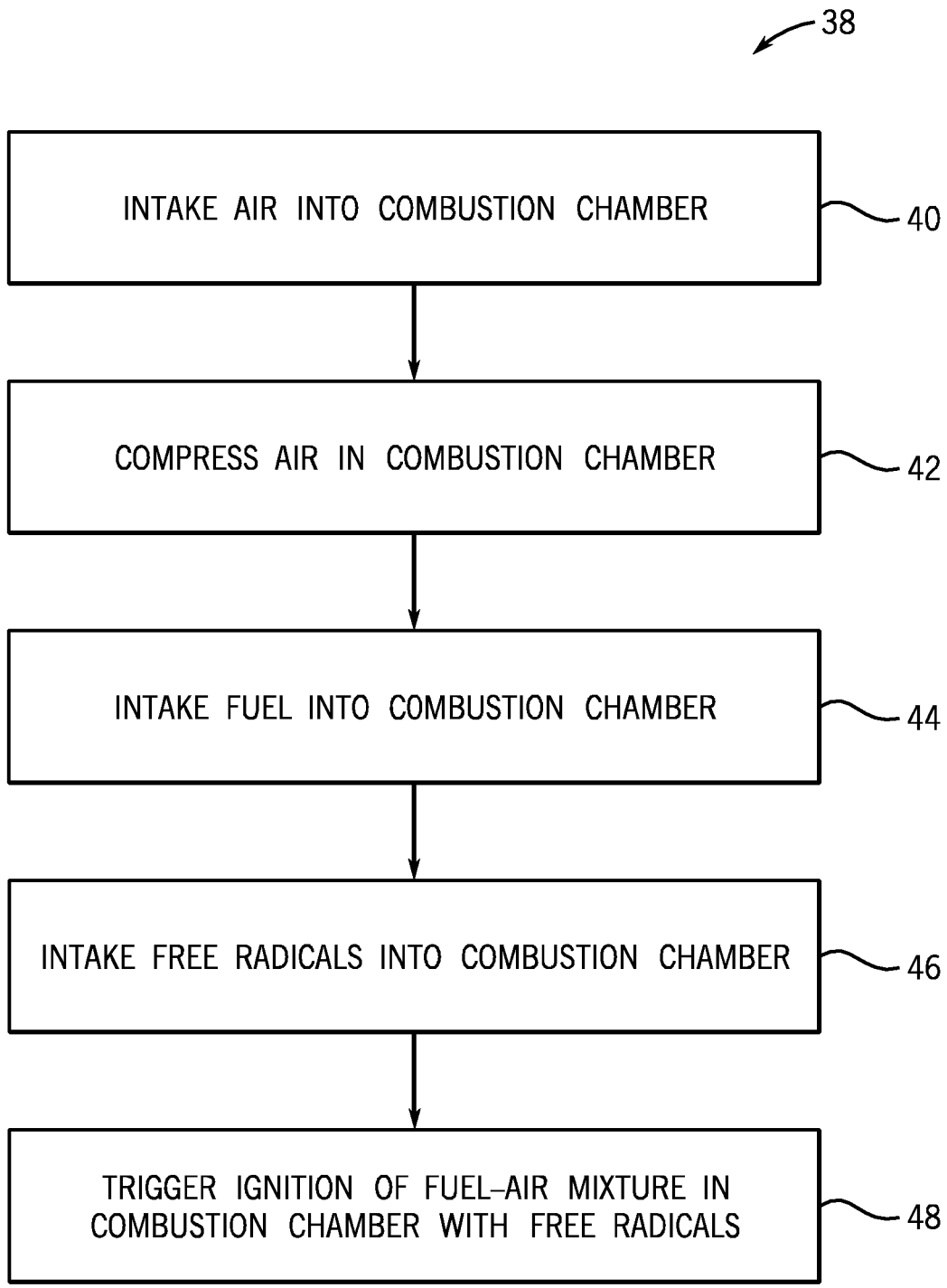
FIG. 2 is a flow chart of a process for free radical combustion in an internal combustion engine according to one embodiment.

FIG. 2 is a flow chart of an embodiment of a process 38 for free radical induced combustion in a combustion system. The process 38 includes an air intake into a combustion chamber (block 40), and a compression of the air in the combustion chamber (block 42). For example, the combustion chamber 14 of FIG. 1 may compress the air via an upward stroke of the piston 22 in the cylinder 24. At an appropriate timing, the process 38 intakes fuel into the combustion chamber (block 44) to enable fuel air mixing within the combustion chamber. For example, the fuel intake may occur during the upward stroke of the piston 22 prior to a top dead center position of the piston 22. At a subsequent timing, the process 38 may intake free radicals into the combustion chamber (block 46). For example, the free radical intake may occur near, at, or after the top dead center position of the piston 22. Upon injection of the free radicals, the process 38 rapidly triggers ignition of the fuel air mixture in the combustion chamber via the free radicals (block 48). While in the present embodiment fuel intake occurs prior to free radical intake, other embodiments contemplate free radical intake before the fuel intake. In still further embodiments, fuel and free radical intake may occur simultaneously.

In the process 38 of FIG. 2, the free radicals may be injected by a positive displacement device, an external source of pressurized free radicals, or another suitable source. Again, the free radicals may include peroxides, aldehydes, monatomic hydrogen, or any combination thereof. In the presence of the elevated pressure and elevated temperature, the free radicals operate to rapidly ignite the fuel air mixture more uniformly and completely throughout the combustion chamber. The free radicals may be analogized with many small spark plugs distributed throughout the combustion chamber, thereby providing multiple distributed ignition points to improve the combustion process. Accordingly, it may be desirable to provide a uniform injection of the free radicals throughout the combustion chamber. The free radicals provide more complete and uniform combustion, and in a much more rapid manner. As a result, the free radical induced combustion may be substantially more efficient with less undesirable exhaust emissions (e.g., less nitrogen oxides, or $NO_x$) as compared with conventional ignition systems. By using free radicals, rapid ignition and a lower combustion temperature of the fuel/air mixture are possible. These two conditions are unfavorable to NOx production. Furthermore, carbon monoxide production is reduced, due to the more complete and uniform combustion at a lower fuel/air ratio.

Figure 3:
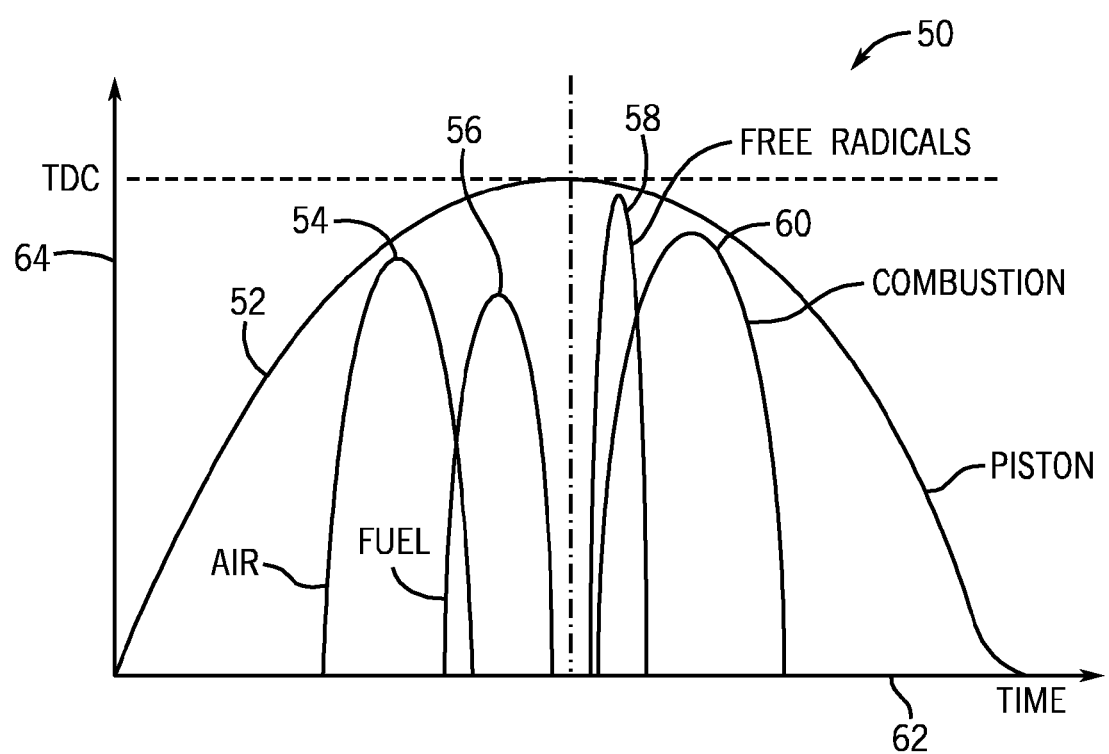
FIG. 3 is a graph illustrating the timing of the free radical injection system with respect to the position of the piston according to one embodiment.

FIG. 3 is a graph of an embodiment of a timing scheme 50 for injection of air, fuel, and free radicals with respect to the position of the piston 22 in the combustion chamber 14 of FIG. 1. As illustrated, the timing scheme 50 includes a piston timing curve 52, an air timing curve 54, a fuel timing curve 56, a free radical timing curve 58, and a combustion timing curve 60. In general, the curves 54, 56, 58, and 60 may occur in order as indicated by a time axis 62, but may temporally overlap with one another during a cycle of the piston 22 as indicated by a piston position axis 64. As illustrated by the piston timing curve 52, the piston 22 moves upward from a bottom dead center (BDC) position to a top dead center (TDC) position, and then back toward the BDC position. During this cycle of the piston 22, the combustion volume 26 compresses during the upward compression stroke toward the TDC position, and then expands during the downward power stroke (or combustion) toward the BDC position.

During the compression stroke, the timing scheme 50 may provide the air to the combustion chamber as indicated by the air timing curve 54, and then subsequently provide the fuel to the combustion chamber as indicated by the fuel timing curve 56. In certain embodiments, the fuel timing curve 56 may include a single injection timing or multiple injection timings, e.g., a pilot fuel injection and a main fuel injection. At, near, or after the TDC position, the timing scheme 50 may provide the free radicals to the combustion chamber as indicated by the free radical timing curve 58. In the illustrated embodiment the free radical timing curve 58 occurs at least slightly after the TDC position of the piston, at least in part due to the rapid ignition and combustion induced by the free radicals. In some embodiments, the free radicals may be injected between approximately 0 to 25, 0 to 20, 0 to 15, or 0 to 10 degrees before or after the TDC position. For example, the free radicals may be injected at least approximately 1, 2, 3, 4, 5, 6, 7, 8, 9, or 10 degrees after the TDC position. In turn, the timing scheme 50 includes the combustion timing curve 60, which substantially overlaps the free radical timing curve 58. Again, the free radicals rapidly ignite the fuel air mixture in the combustion chamber, and thus the combustion timing curve 60 is shown as starting at or slightly after the start of the free radical timing curve 58. While in the present embodiment the free radicals are injected at or near TDC position it is understood that free radicals may be injected at BDC position or any position in between. Like free radical injection, fuel injection may also vary with respect to the location of the piston. When and at what piston position, free radicals and fuel are injected into the cylinder depends on the particular design.

Figure 4:
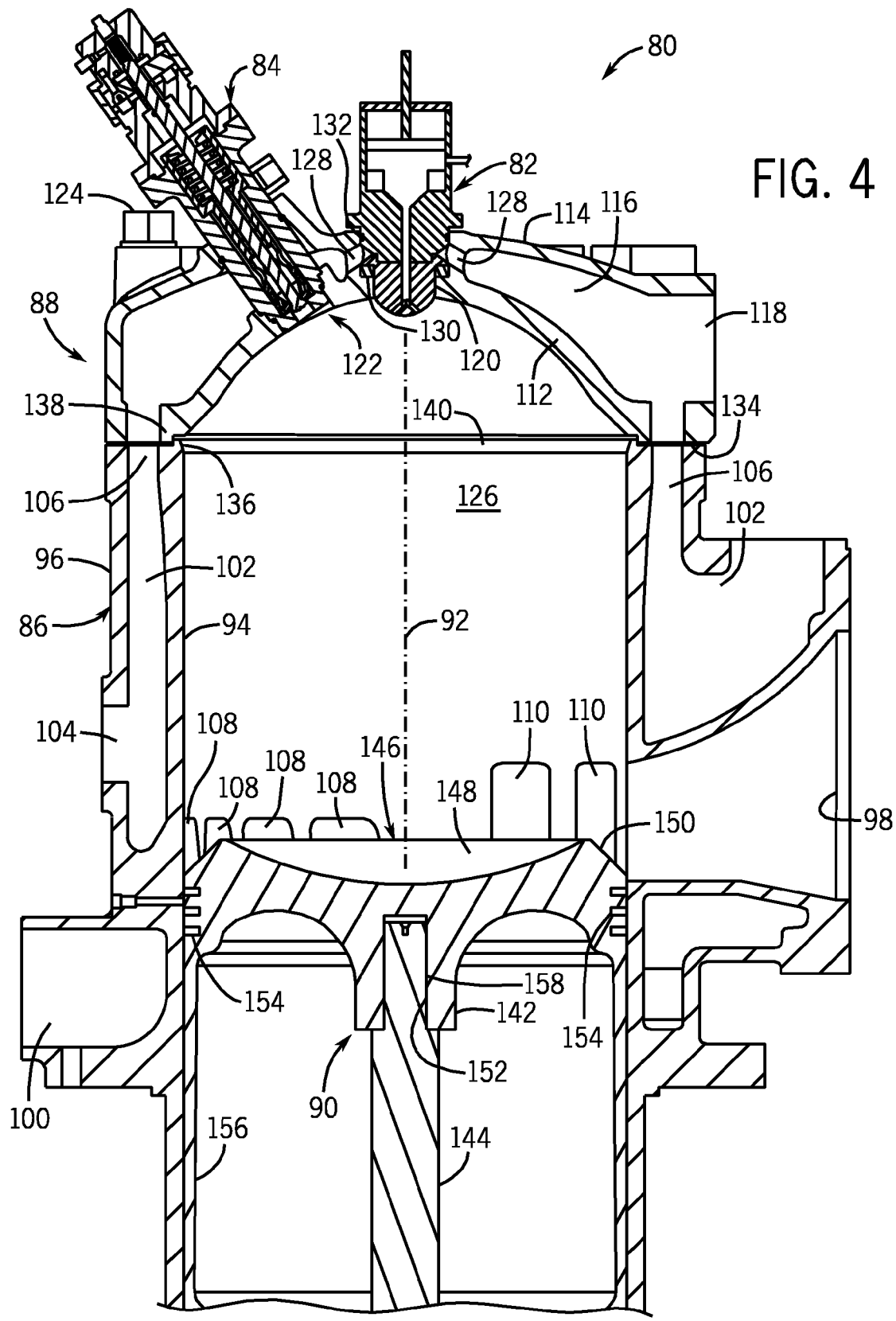
FIG. 4 is a cross-sectional view of an embodiment two-stroke engine with a free radical injection device.

FIG. 4 is a cross-sectional view of an embodiment of a two-stroke engine 80 incorporating a free radical injection device 82 configured to provide free radical induced ignition and combustion. In the illustrated embodiment, the engine 80 a fuel injector 84, a cylinder 86, a head 88, and a piston assembly 90. The illustrated cylinder 86 is generally concentric about a central axis 92 and includes an inner sidewall 94, an outer sidewall 96, an exhaust outlet 98, and an air inlet 100. The inner sidewall 94 and the outer sidewall 96 are spaced away from each other and together define a cavity 102 for circulating coolant around the inner sidewall 94 and cooling the engine 80. Coolant may flow into or out of the cavity 102 through an aperture 104 in the outer sidewall 96. The cavity 102 may also include a plurality of apertures 106 that place the cavity 102 in fluid communication with portions of the head 88, as described below. The inner sidewall 94 is penetrated by a plurality of passages 108 that converge in the air inlet 100 and a plurality of passages 110 that converge in the exhaust outlet 98. The passages 110 may extend closer to the head 88 than the passages 108 to increase the portion of the piston's stroke during which exhaust gas may flow through the passages 110 relative to the portion of the piston's stroke during which air may flow in through the passages 108. During a down stroke, exhaust gas may first flow out through the passages 110 before air flows into the cylinder 86 through the passages 108 and purges the remaining exhaust. In some embodiments, the cylinder 86 has a bore (diameter) between 10 and 20 inches, e.g., between 14 and 18 inches.

The cylinder 86 couples to the head 88, which also has a shape that is generally concentric about the central axis 92. In this embodiment, the head 88 includes an inner wall 112, an outer wall 114, a cavity 116, a coolant inlet 118, a free radical injection device aperture 120, a gas injection valve aperture 122, and bolts 124. One side of the inner wall 112 defines a generally dome-shaped portion of a main combustion chamber 126, and the space between the inner wall 112 and the outer wall 114 generally defines the cavity 116.

In this embodiment, the cavity 116 is in fluid communication with the coolant inlet 118 and with the coolant outlet 104 through both the apertures 106 and the cavity 102 in the cylinder 86. In some embodiments, the flow may be reversed and inlet 118 may be an outlet. The illustrated cavity 116 includes a plurality of passages 128 that extend to the free radical injection device 82 for cooling the free radical injection device 82. A portion of the cavity 116 also surrounds a part of the fuel injector 84.

The illustrated free radical injection device aperture 120 is generally centrally located at the top of the head 88 and is generally concentric about the central axis 92. As explained below, positioning the free radical injection device 82 generally centrally above the main combustion chamber 126 is believed to contribute to a more even propagation of a flame throughout the main combustion chamber 126 and improve engine efficiency. In other embodiments, the free radical injection device 82 and the free radical injection device aperture 120 may be located elsewhere on the head 88 or the engine 80, e.g., to the side of the central axis 92 similar to the gas injection valve 84. The free radical injection device aperture 120 extends between the main combustion chamber 126 and the exterior of the head 88, and it includes a shoulder 130 and a sidewall 132 that abut seals on the free radical injection device 82, as described below. The shoulder 130 and the sidewall 132 may be generally concentric about the central axis 92.

The illustrated bolts 124 extend through the head 88 and thread to the cylinder 86, biasing the head 88 against the cylinder 86. A gasket 134 may be positioned between the head 88 and the cylinder 86, such that it is compressed by the bolts 124. In this embodiment, the head 88 and the cylinder 86 include overlapping flanges 136 and 138. The illustrated flange 136 includes a fillet 140 on the side facing the main combustion chamber 126.

The piston assembly 90 includes a piston 142 and a shaft 144. In some embodiments, the piston 142 includes a crown 146 with a generally dome-shaped portion 148 and a chamfered portion 150, an aperture 152, a plurality of seals 154, and a sleeve 156. The illustrated piston assembly 90 is generally concentric about the central axis 92. The dome-shaped portion 148 of the crown 146 generally defines a segment of a sphere, and the chamfer 150 generally defines a frustoconical volume. The piston 142 is illustrated at or near one end of its stroke, referred to as a bottom dead center. In this position, both the passages 108 and the passages 110 are in fluid communication with the main combustion chamber 126. The aperture 152 includes internal threads that are complementary to external threads on a distal portion 158 of the shaft 144. The illustrated piston assembly 90 includes three piston ring seals 154 that are disposed above the sleeve 156 and below the chamfer 150. Other embodiments may include more or fewer seals 154 or other types of seals. The sleeve 156 is a generally tubular member that is generally concentric about the central axis 92. The sleeve 156 extends a distance along the cylinder 86 such that the sleeve 156 obstructs the passages 108 and 110 when the piston assembly 90 is at the other end of its stroke referred to as top dead center. In some embodiments, the sleeve 90 may be longer than or generally equal to the length of the stroke of the piston assembly 90.

Figure 5:
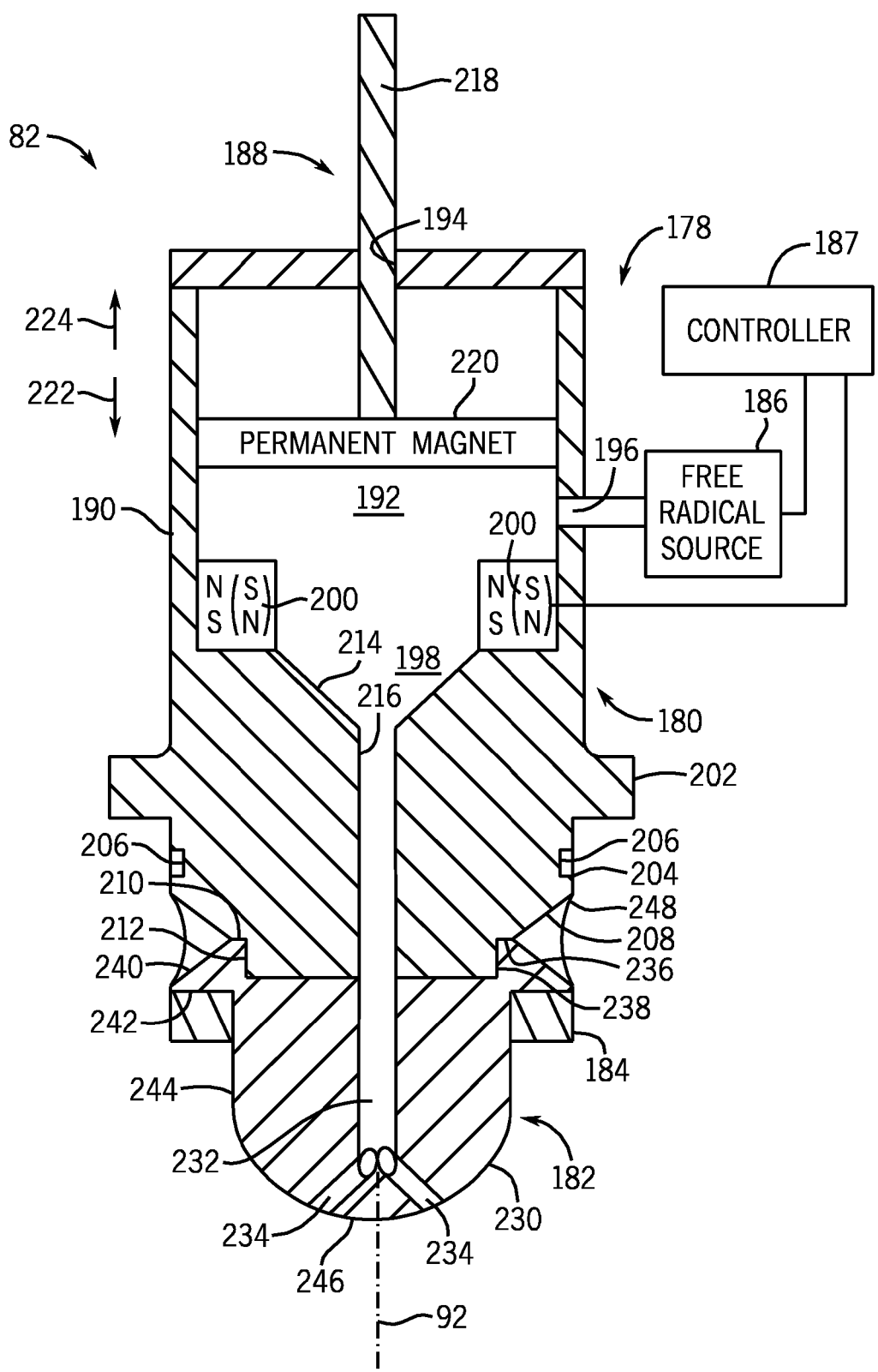
FIG. 5 is a cross-sectional view of an embodiment of a free radical injection device in the engine of FIG. 4.

FIG. 5 is a cross-sectional view of an embodiment of the free radical injection device 82 of FIG. 4, illustrating a positive displacement injection system 178 configured to positively force free radicals into the combustion chamber 126 at an appropriate ignition timing. In the illustrated embodiment, the free radical injection device 82 includes an upper body 180, a lower body 182, a seal 184, a free radical source 186, and a controller 187. The positive displacement injection system 178 includes a piston assembly 188, although any other suitable positive displacement device is within the scope of the disclosed embodiments. In operation, the controller 187 is configured to engage the piston assembly 188 to positively displace free radicals from the free radical source 186 into the combustion chamber 126, thereby causing free radical induced ignition without a spark plug, glow plug, or the like. For example, the controller 187 may actuate the piston assembly 188 at an ignition timing at, near, or slightly after top dead center (TDC) of the piston stroke.

Turning now to structural features of the free radical injection device 82, the upper body includes an outer surface 190, a pre-chamber 192, a shaft aperture 194, a free radical source aperture 196, a passage 198, and electromagnets 200. The outer surface 190 of the upper body 180 includes a first flange 202, a recess 204, a seal 206 disposed in the recess 204, a chamfer 208, a shoulder 210, and a second flange 212. The seal 206 may be an O-ring or other appropriate type of seal that seals coolant within the cavity 116 of the head 88 (FIG. 4). The pre-chamber 192 is generally cylindrical. The electromagnets 200 are secured within the pre-chamber 192 proximate the passage 198. The electromagnets 200 maybe any electromagnets that change their north and south poles upon command by the controller 187. The free radical source aperture 196 opens into the pre-chamber 192 allowing free radicals to enter from the free radical source 186.

The passage 198 defines a frustroconical top portion 214 and a narrow generally cylindrical bottom portion 216. The frustroconical top portion may assist in directing free radicals into the narrow portion 216 of the passage 198. The passage 198 allows free radicals entering the pre-chamber 192 to enter the lower body 182 of the free radical injection device 82.

The illustrated lower body 182 includes an outer surface 230, a primary passage 232, and secondary passages 234. The outer surface 230 further defines an upper shoulder 236, a flange 238, a chamfer 240, a lower shoulder 242, a sidewall 244, and a dome 246. The flange 238 and upper shoulder 236 are configured to abut and overlap both the flange 212 and the shoulder 210 of the upper body 180. In this embodiment, a weld 248 joins the chamfer 240 on the lower body 182 to the chamfer 208 on the upper body 180. The illustrated upper body 180 and lower body 182 are cast and then machined separately before being joined permanently by the weld 248. In other embodiments, these components 180 and 182 may be separable and joined with other features, e.g., a threaded connection or bolts. The lower shoulder 242 is generally perpendicular to the central axis 92 (FIG. 4) and abuts the seal 184. The sidewall 244 may define a generally right circular-cylindrical volume and may be generally concentric about the central axis 92. The illustrated dome 246 generally defines a segment of a sphere, e.g., a segment less than a hemisphere, but in other embodiments may have other shapes, such as a flat surface, a portion of an ellipsoid, or a faceted surface (which is not to suggest that a faceted surface may not also generally define a segment of a sphere or other curved shape).

The primary passage 232 may join the secondary passages 234 at an area that generally lies along the central axis 92, and the secondary passages 234 may be generally rotationally symmetric about the central axis 92. In this embodiment, the secondary passages 234 are at an angle with respect to the central axis 92, which may be between approximately 0 to 110 degrees, 10 to 80 degrees, or 10 to 30 degrees. In other embodiments, the secondary passages 234 may extend in other directions, e.g., generally perpendicular to the central axis 92, radially outward. Both the primary passage 232 and the secondary passages 234 are generally straight, but in other embodiments, they may curve or bend. Both the primary passage 232 and the secondary passages 234 generally define right circular-cylindrical volumes, but in other embodiments, they may generally define other shapes, e.g., a non-right circular-cylindrical volume, an elliptical-cylindrical volume, a rectangular cylindrical volume, a converging volume (e.g., conical), a diverging volume (e.g., conical), or some combination thereof. Additional details of the secondary passages 234 are described below with reference to FIG. 6.

The seal 184 is a generally annular member configured to seal the main combustion chamber 126 from the cavity 116 in the head 88. In this embodiment, the seal 184 is disposed around the walls 244 and against the shoulder 242.

Turning now to the positive displacement injection system 178, the piston assembly 188 includes a shaft 218 and a piston 220 connected to the shaft 218. As illustrated in FIG. 5 the piston 220 includes a permanent magnet, which interacts with the electromagnet 200 operated by the controller 187 to provide reciprocal motion. During operation of the free radical injection device 82, the free radicals are inserted into the pre-chamber 192 of the upper body 180 between the permanent magnet 220 and the electromagnet 200. Upon actuation by the controller 187, the electromagnet 200 attracts the permanent magnet piston 220 towards the electromagnets 200 in direction 222. The downward movement 222 of the piston 220 forces (i.e., positively displaces) the free radicals through the passage 198, into the primary passage 232, and then out through the secondary passages 234 into the combustion chamber 126. In order to repeatedly inject free radicals from the pre-chamber 192 into the combustion chamber 126, the controller 187 then actuates the electromagnet 200 to reverse the piston 220 to move in an opposite direction 224 away from the electromagnets 200. Specifically, the controller 187 operates to reverse the polarity of the electromagnets 200, such that a first polarity attracts the piston 220 in the downward direction 222 and a second polarity repels the piston 224 in the opposite upward direction 224. Upon completing the upward stroke of the piston 220, the controller 187 then repeats the cycle by injecting another volume of the free radicals into the pre-chamber 192, reversing the polarity of the electromagnets 200 to cause downward movement 222 of the piston 220 to inject the free radicals, and then subsequently reversing the polarity of the electromagnets 200 to cause upward movement 224 of the piston 220 after the free radical injection. In other embodiments, the piston 220 may include an electromagnet rather than a permanent magnet, and the electromagnet 200 may be exchanged for a permanent magnet. In still further embodiments, all of the magnets may be electromagnets. Alternatively, the piston 220 may be driven by another mechanism, such as a pneumatic drive.

Figure 6:
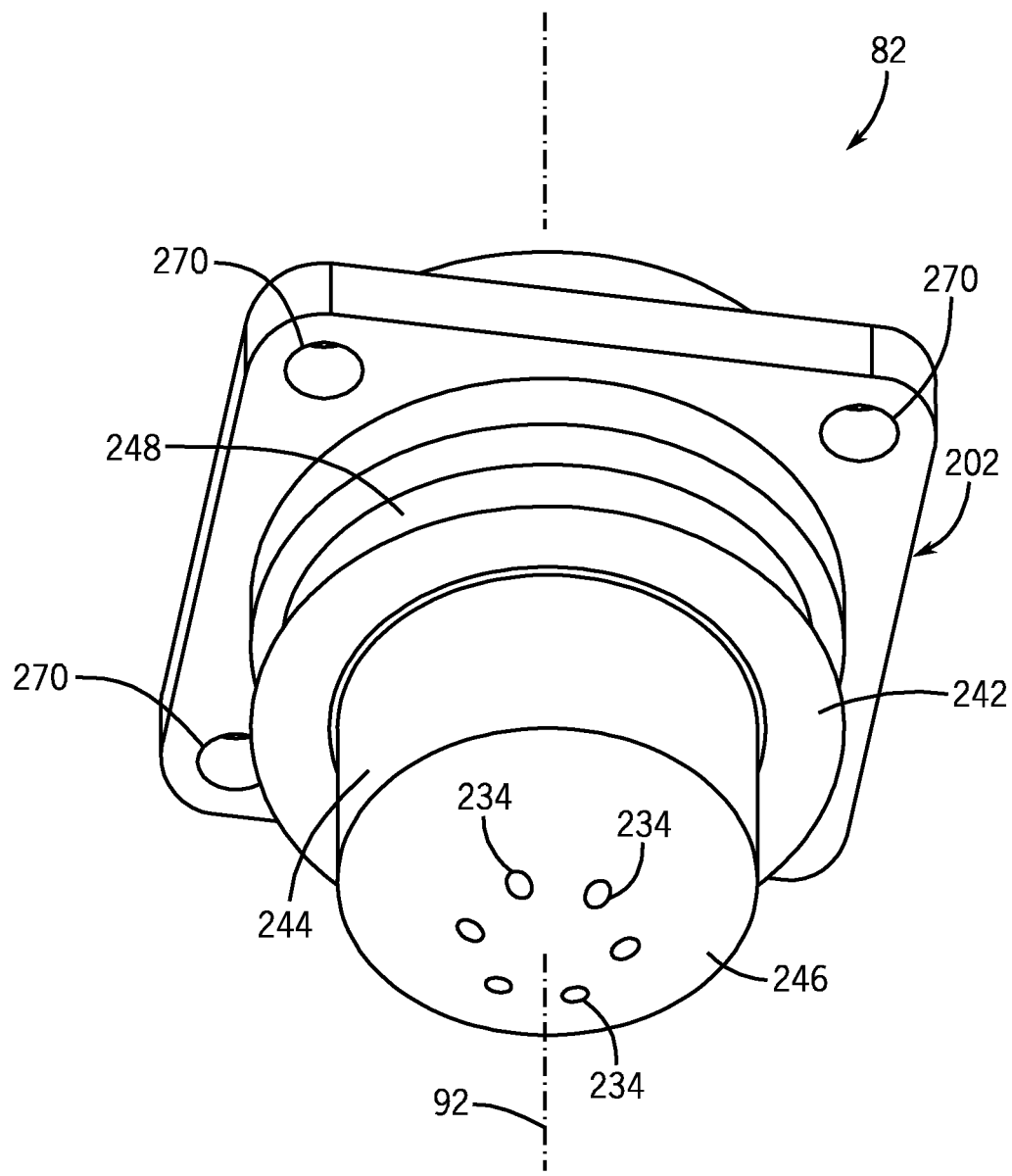
FIG. 6 is a perspective view of an embodiment of a free radical injection device of FIG. 5.

FIG. 6 is a perspective view of an embodiment of the free radical injection device 82. As illustrated, in this embodiment, the features of the free radical injection device 82 are generally concentric about the central axis 92 except the flange 202. The flange 202 defines a generally cuboid volume with chamfered corners. Apertures 270 may be disposed in each of the corners for receiving bolts that secure the free radical injection device 82 to the head 88. In this embodiment, the free radical injection device 82 is secured to the head 88 without directly threading the free radical injection device 82 to the head 88. Bolts extending through the apertures 270 bias the shoulder 242 against the head 88 and restrict movement of the free radical injection device 82 relative to the head 88.

As further illustrated in FIG. 6, the free radical injection device 82 includes six secondary passages 234 to disperse the free radicals in different directions into the combustion chamber 126. In other embodiments, the free radical injection device 82 may include more or fewer secondary passages 234, e.g. 1 to 50, 1 to 25, or 1 to 10 secondary passages 234. For example, the free radical injection device 82 may include at least 1, 2, 3, 4, 5, 6, 7, 8, 9, or 10 secondary passages 234. As illustrated, the secondary passages 234 are generally evenly distributed radially around the central axis 92 at approximately 60 degree intervals. Other embodiments may include additional secondary passages 234 that are at different angles with respect to the central axis 92, e.g., a secondary passage 234 that is generally coaxial with the central axis 92 and another set of secondary passages 234 that are at a larger angle relative to the central axis 92 than the illustrated secondary passages 234. In some embodiments, the secondary passages 234 may exit the dome 246 at several different angles with respect to the central axis 92, e.g., ranging between approximately 0 to 90 degrees. For example, one or more secondary passages 234 may be disposed at angles of approximately 0, 15, 30, 45, 60, and 75 degrees relative to the axis 92. Further, the passages 234 may have varying diameters or shapes. For instance, passages 234 at a larger angle relative to the central axis 92 may have a larger diameter than passages 234 at a smaller angle. While in the present embodiment, the dome defines multiple passages 234, the dome may instead include a conical diffuser in lieu of multiple passages leading into the combustion chamber 126. In still further embodiments, the dome may define a conical diffuser in association with a plurality of passages or perhaps even multiple conical diffusers for venting the free radicals in the combustion chamber. The conical diffuser may have an angle change between approximately 5 to 20 degrees. Regardless, the passageways and diffusers will vary in size, shape, and angles, depending on the size of the combustion chamber 126, velocity suitable to effectively mix the free radicals, and the desired ignition timing of the combustion process.

Figure 7:
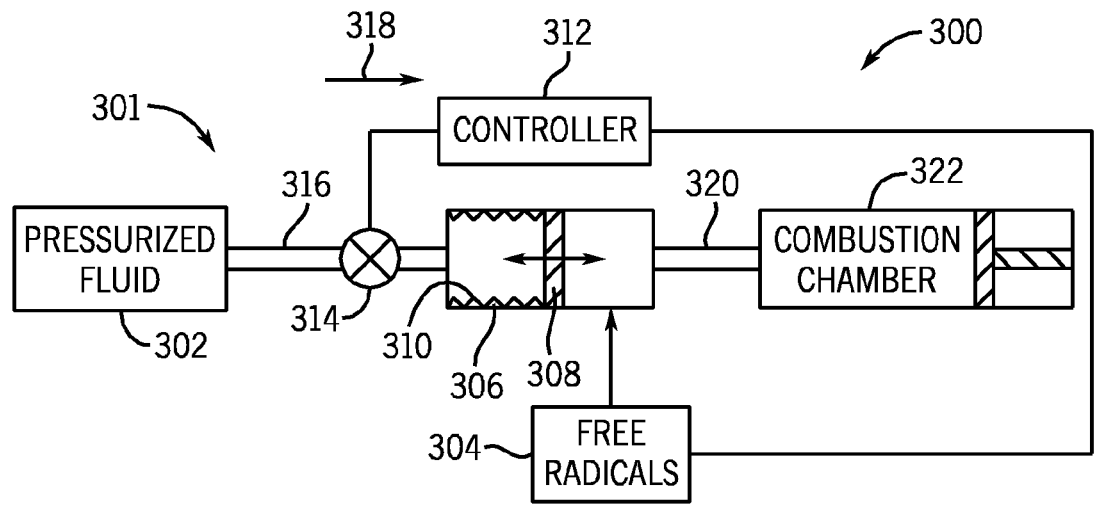
FIG. 7 is a schematic of an embodiment of a free radical injection system.

FIG. 7 is a schematic of an embodiment of a free radical injection device 300 having a fluid-driven positive displacement system 301 to drive free radicals into a combustion chamber 322. As illustrated, the free radical injection device 300 includes a pressurized fluid source 302, free radical source 304, a cylinder 306, piston 308, springs 310, controller 312, and valve 314. The fluid-driven positive displacement system 301 generally includes the pressurized fluid source 302 in combination with the piston 308 and associated elements. The pressurized fluid source 302 may include compressed air, exhaust gas, nitrogen, steam, hydraulic fluid, or any other suitable gas, liquid, or vapor. As discussed above, the free radical source 304 may include peroxides, aldehydes, monatomic hydrogen, or any combination thereof.

During operation, free radicals are inserted into the cylinder 306 based on signals received from the controller 312. When the free radicals are inside the cylinder 306, the controller 312 then actuates the valve 314. The valve 314 may be any suitable valve, such as a butterfly valve, a gate valve, a pinch valve, or a ball valve. The controller 312 opens the valve 314 releasing the pressurized fluid source through a passageway 316 into the cylinder 306. The pressurized fluid contacts the piston 308, thereby forcing the piston 308 to move in direction of arrow 318. As the piston 308 moves in the direction of arrow 318, the piston 308 forces free radicals in the cylinder 306 to flow out of the cylinder 306 through a passageway 320 and into a combustion chamber 322. After injection of the free radicals into the combustion chamber 322, the pressurized fluid is removed and the valve 314 closed. Once the pressure is removed, the springs 310 retract the piston 308 in a direction opposite that of arrow 318. The process is repeated for each ignition event.

Figure 8:
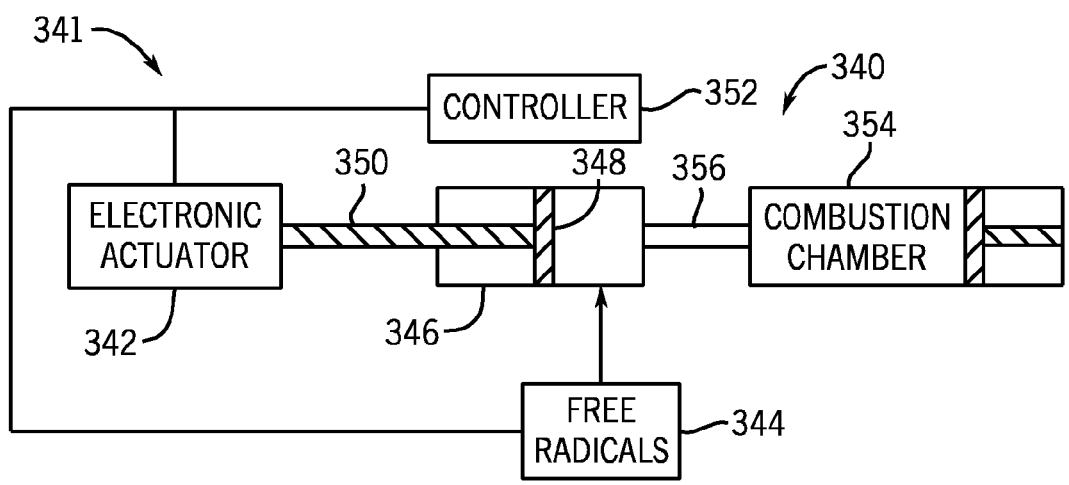
FIG. 8 is a schematic of an embodiment of a free radical injection system.

FIG. 8 is a schematic of an embodiment of a free radical injection device 340 having a electronic-driven positive displacement system 341 to drive free radicals into a combustion chamber 354. The free radical injection device 340 includes an electronic actuator 342, free radical source 344, a cylinder 346, piston 348, shaft 350, and controller 352. The electronic-driven positive displacement system 341 generally includes the electronic actuator 342 in combination with the piston 348 and associated elements. The electronic actuator 342 may include a solenoid, an alternating current (AC) drive, a direct current (DC) drive, a piezoelectric drive, a linear motor, an induction motor, or some combination thereof. As discussed above, the free radical source 344 may include peroxides, aldehydes, monatomic hydrogen, or any combination thereof.

During operation, free radicals are inserted into the cylinder 346 when signaled by controller 352. When the free radicals are inside the cylinder 346, the controller 352 actuates the electronic actuator 342. The electronic actuator 342 then moves the piston 348 via the shaft 350 in the direction of the combustion chamber 354. The movement of the piston 348 forces the free radicals through a passageway 356 into the combustion chamber 354, thereby causing free radical induced ignition and combustion in the combustion chamber 354. After injection of the free radicals into the combustion chamber 354, the electronic actuator retracts the shaft 350 and piston 348. With the piston 348 retracted, free radicals may again be inserted into the cylinder 346 and the process is repeated.

FIG. 9 is a schematic of an embodiment of a free radical injection device 370 having a fluid-driven positive displacement system 371 to drive free radicals into a combustion chamber 386. The free radical injection device 370 includes a pressurized fluid source 372, free radical source 374, a cylinder 376, membrane 378, controller 380, and valve 382. The fluid-driven positive displacement system 371 generally includes the pressurized fluid source 372 in combination with the membrane 378 and associated elements. The pressurized fluid source 372 may include compressed air, exhaust gas, nitrogen, steam, hydraulic fluid, or any other suitable gas, liquid, or vapor. As discussed above, the free radical source 374 may include peroxides, aldehydes, monatomic hydrogen, or any combination thereof.

During operation, free radicals are inserted into the cylinder 376 when signaled by controller 380. When the free radicals are inside the cylinder 376, the controller 380 actuates the valve 382. The valve 382 may be any suitable valve, such as a butterfly valve, a gate valve, a pinch valve, or a ball valve. The controller 380 opens the valve 382 releasing the pressurized fluid source through a passageway 384 into the cylinder 376. The pressurized fluid contacts the membrane 378 flexing the membrane 378 in the direction of the combustion chamber 386. As the membrane 378 flexes in the direction of the combustion chamber 386, the membrane 378 forces free radicals in the cylinder 376 to flow out through a passageway 388 and into the combustion chamber 386. After injection of the free radicals into the combustion chamber 386, the pressurized fluid is removed and the valve 382 is closed. Once the pressure is removed, the membrane 378 flexes back to a normal state. The process is repeated for each ignition event.

FIG. 10 is a schematic of an embodiment of a free radical injection device 400 having a pressurized free radical source 402. As illustrated, the free radical injection device 400 also includes a valve 404 and a controller 406 configured to control flow of the pressurized free radicals into a combustion chamber 408 at an appropriate ignition timing. In operation, the controller 406 actuates the valve 404 allowing the pressurized free radicals to flow through a passageway 410 and into the combustion chamber 408. Once a sufficient amount of free radicals have passed through the passageway 410, the controller 406 closes the valve 406 to terminate the flow of more pressurized free radicals. The process is repeated for each ignition event. Again, the free radicals are configured to rapidly ignite the fuel air mixture in the combustion chamber 408 without a spark, relying instead on the combination of elevated pressure, elevated temperature, and distribution of free radicals.

Figure 11:
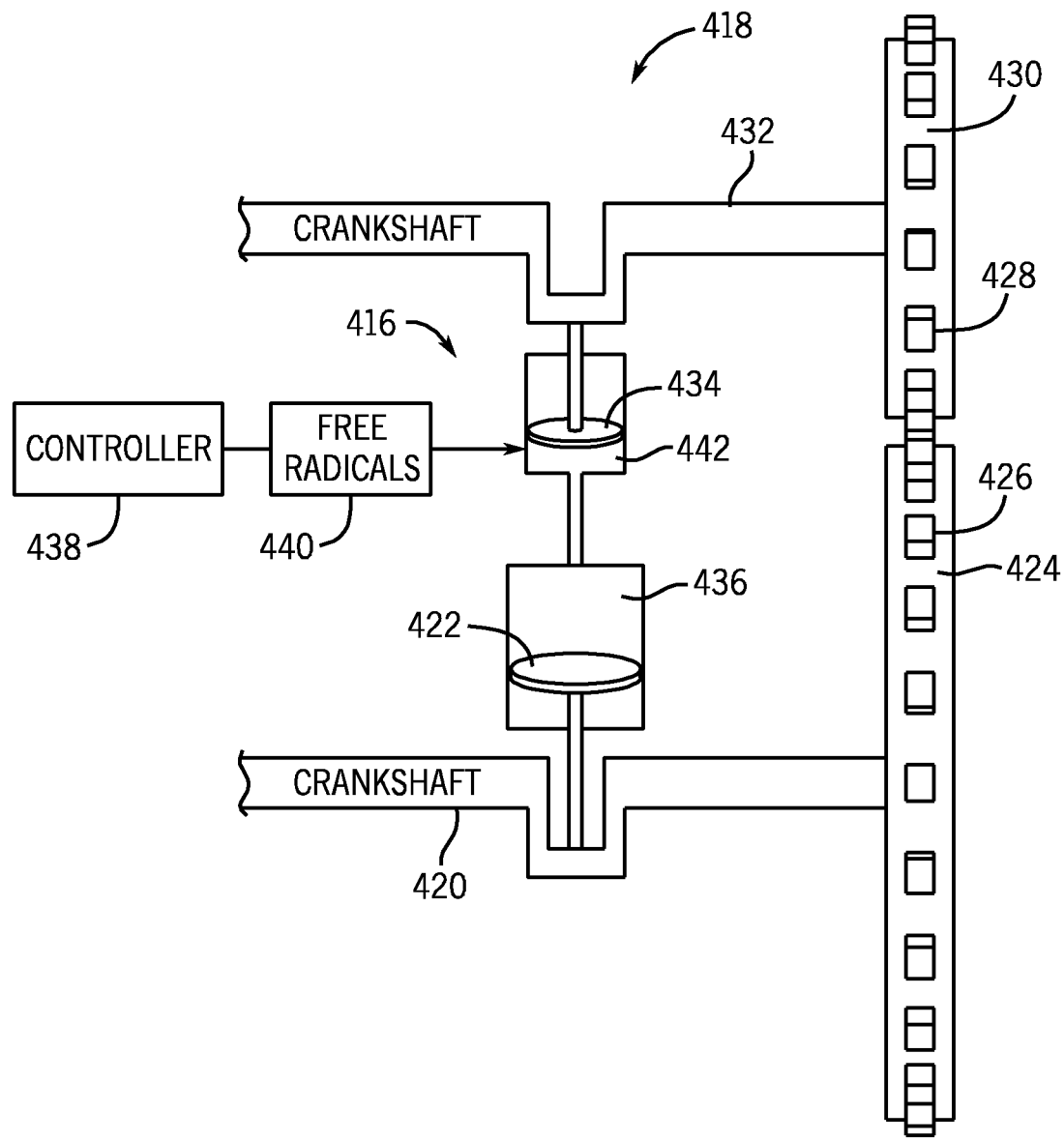
FIG. 11 is a schematic of an embodiment of a free radical injection system.

FIG. 11 is a schematic of an embodiment of a free radical injection device 416 integrally driven by a combustion engine 418, thereby integrally timing injection of free radicals with the engine cycle. As illustrated, the combustion engine 418 includes a main engine crankshaft 420 coupled to a main engine piston 422, wherein the crankshaft 420 rotates to move the piston 422 reciprocally between a bottom dead center (BDC) position and a top dead center (TDC) position. In turn, the crankshaft 420 is coupled to a primary gear 424 having teeth 426, which engage teeth 428 of a secondary gear 430. In some embodiments, the gears 424 and 430 may be connected via a timing chain or a timing belt. The secondary gear 430 is coupled to a secondary crankshaft 432, e.g., an ignition timing crankshaft, which is coupled to a secondary piston 434 that forces free radicals into a main combustion chamber 436. Thus, the crankshafts 420 and 432 and associated gears 424 and 430 integrally time movement of the pistons 422 and 434 to inject free radicals into the combustion chamber 436 at a suitable ignition timing. In still other embodiments, the pistons 434 and/or 422 may be cam-driven. During operation, a controller 438 controls the injection of free radicals from a free radical source 440 into a cylinder 442 having the piston 434. In turn, the piston 434 forces the free radicals into the combustion chamber 436 to cause free radical induced ignition and combustion of a fuel air mixture. The combustion forces the piston 422 away from the TDC position toward the BDC position, thereby causing rotation of the crankshaft 420, gears 424, and 430, and crankshaft 432. Thus, during the downward stroke of the piston 422, the various linkages cause an upward stroke of the piston 434. The cycle repeats to cause free radical injection at, near, or slightly after the TDC position of the piston 422. In the illustrated embodiment, the free radical injection device 400 may be described as integrated to the combustion engine 402, and relying on power of the engine 402 rather than an external power source to drive the free radical injection.

FIGS. 12A and 12B are schematics of an embodiment of a free radical injection device 470, illustrating an engine cycle. In particular, FIG. 12A illustrates an upward stroke or compression stroke, whereas FIG. 12B illustrates a downward stroke or power stroke. As illustrated in FIGS. 12A and 12B, the free radical injection device 470 includes a positive displacement device 472 and a controller 474 configured to control injection of free radicals for ignition of a fuel air mixture. As illustrated in FIG. 12A, a fuel injector 476 injects a combustible fuel, such as a gaseous or liquid fuel, into a combustion chamber 478 during a compression stroke of a piston 480. During the compression stroke, the fuel mixes with air to create a fuel air mixture in the combustion chamber 478. Initially, the fuel air mixture may be ignited by a spark plug or an external source of free radicals. However, combustion of the fuel air mixture creates unburned free radicals, which may be used as a source of free radical induced ignition in subsequent cycles of the engine. Again, the free radicals may include peroxides, aldehydes, monatomic hydrogen, or any combination thereof. In the illustrated embodiment, the free radicals from combustion may flow from the combustion chamber toward the positive displacement device 472, as indicated by arrow 482. Subsequently, as illustrated in FIG. 12B, the positive displacement device 472 may force those same free radicals (with or without an addition source of externally supplied free radicals) back into the combustion chamber to provide free radical induced ignition, as indicated by arrow 484. For example, at an appropriate ignition timing, the controller 474 may actuate the positive displacement device 472 to provide a positive force against the free radicals, thereby positively displacing the free radicals into the combustion chamber. The positive displacement device 472 may include electrical, mechanical, or fluid driven actuators, as discussed above. The process repeats as each combustion event produces unburned free radicals for use as an internal source of free radical induced ignition in the next combustion event. The embodiment of FIGS. 12A and 12B reduces or eliminates the reliance on an external source of free radicals, while also providing precise ignition timing using the positive displacement device 472 in combination with the controller 474.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a combustion chamber; and
a free-radical injector configured to receive free radicals external from the free-radical injector and inject the free radicals into the combustion chamber at an ignition timing to trigger combustion of a fuel-air mixture.

2. The system of claim 1, wherein the free-radical injector is configured to receive the free radicals from a combustion reaction in the combustion chamber.

3. The system of claim 1, wherein the free-radical injector is configured to receive the free radicals from an external source separate from both the combustion chamber and the free-radical injector.

4. The system of claim 1, wherein the free-radical injector comprises a positive displacement injector configured to force the free radicals into the combustion chamber at an ignition timing to trigger combustion of the fuel-air mixture.

5. The system of claim 4, wherein the positive displacement injector comprises a rotary pump.

6. The system of claim 4, wherein the positive displacement injector comprises a reciprocating pump.

7. The system of claim 4, wherein the positive displacement injector comprises a fluid-driven drive.

8. The system of claim 4, wherein the positive displacement injector comprises an electronic drive.

9. The system of claim 1, comprising a pre-chamber coupled to the combustion chamber, wherein the free-radical injector is configured to inject the free radicals from the pre-chamber into the combustion chamber at the ignition timing to trigger combustion of the fuel-air mixture.

10. The system of claim 1, wherein the free-radical injector excludes a spark ignition system.

11. The system of claim 1, wherein the free radicals comprise peroxides, aldehydes, or a combination thereof.

12. A system, comprising:
a free-radical ignition controller configured to control a free-radical injector to receive free radicals external from the free-radical injector and inject the free radicals into a combustion chamber at an ignition timing to trigger combustion of a fuel-air mixture, wherein the free-radical injector is configured to receive the free radicals from an external source separate from both the combustion chamber and the free-radical injector.

13. The system of claim 12, wherein the free-radical ignition controller is configured to control a positive displacement pump to force a flow of the free radicals from the free-radical injector into the combustion chamber.

14. The system of claim 12, comprising the free-radical injector.

15. The system of claim 12, wherein the free-radical injector is configured to receive a portion of the free radicals from a combustion reaction in the combustion chamber.

16. The system of claim 12, wherein the free radicals comprise peroxides, aldehydes, or a combination thereof.

17. The system of claim 12, comprising a combustion engine having the free-radical ignition controller.

18. A method, comprising:
- receiving free radicals into a free-radical injector from an external source separate from both a combustion chamber and the free-radical injector; and
- injecting the free radicals from the free-radical injector into the combustion chamber to trigger combustion of a fuel-air mixture.

19. The method of claim 18, wherein receiving the free radicals comprises receiving the free radicals from a combustion reaction in the combustion chamber and the external source separate from.

20. The method of claim 18, wherein injecting the free radicals comprises positively displacing the free radicals to force a flow of the free radicals from the free-radical injector into the combustion chamber.

\* \* \* \* \*